T. PATTERSON.
APPARATUS FOR FORGING COUPLINGS.
APPLICATION FILED MAR. 29, 1915.

1,157,637.

Patented Oct. 19, 1915.
4 SHEETS—SHEET 1.

WITNESSES

INVENTOR
Thomas Patterson

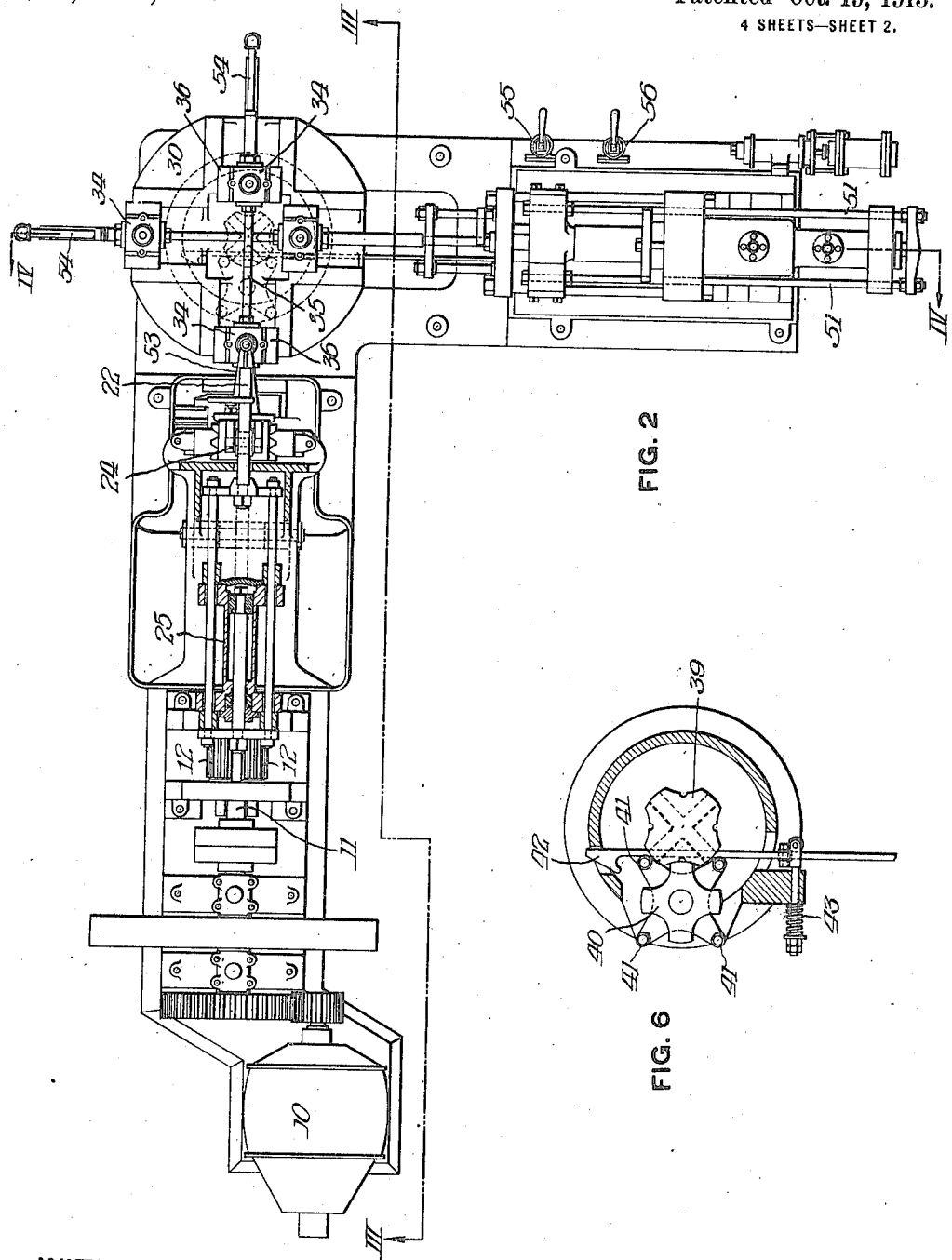

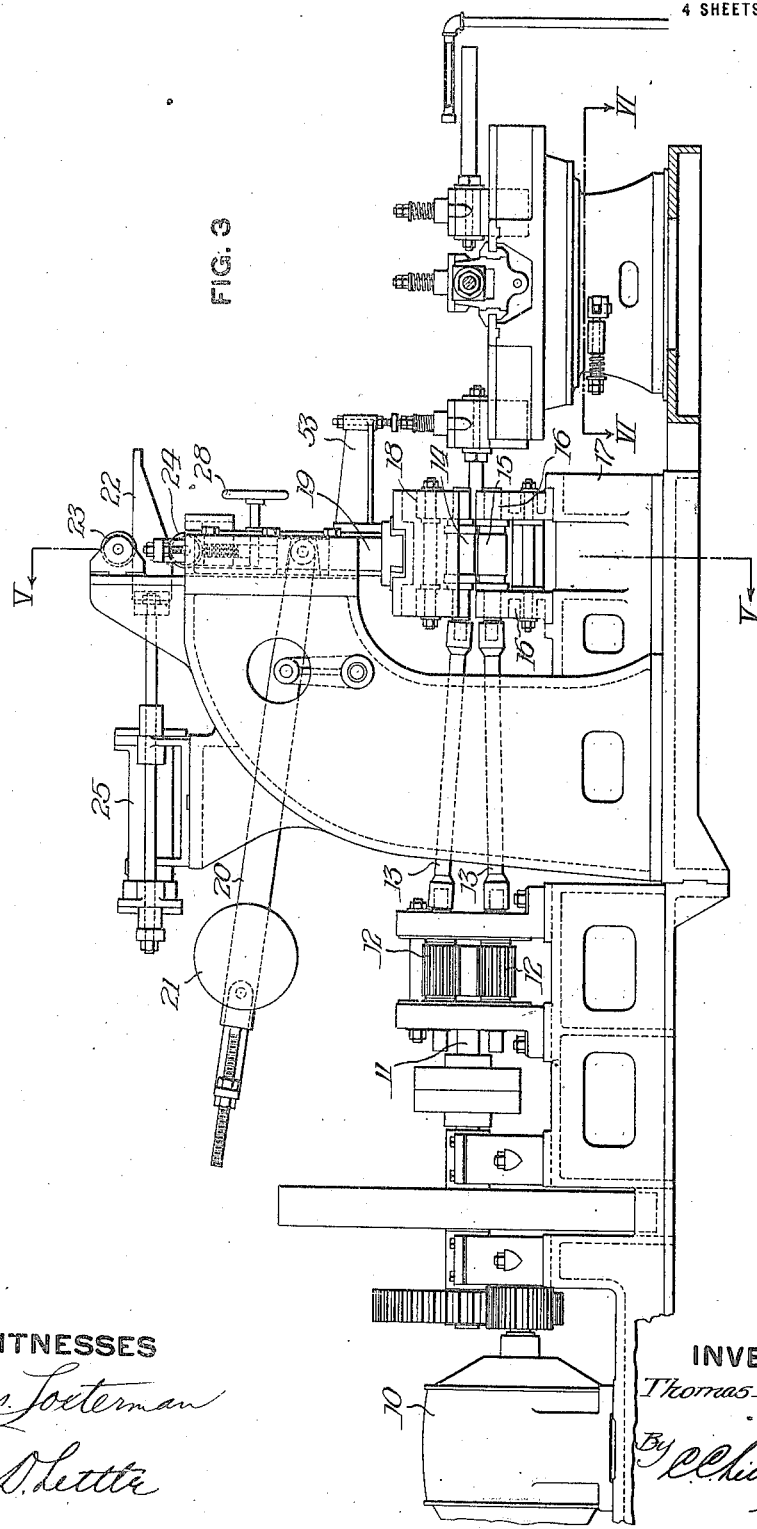

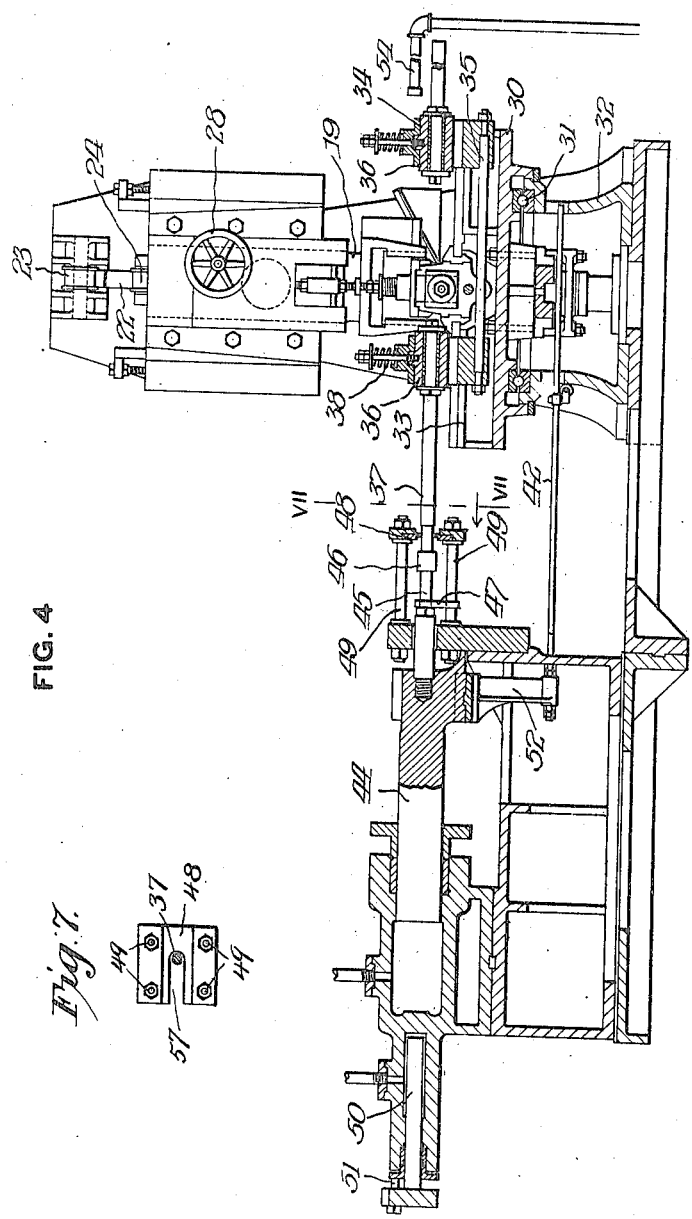

UNITED STATES PATENT OFFICE.

THOMAS PATTERSON, OF ELYRIA, OHIO, ASSIGNOR TO NATIONAL TUBE COMPANY, OF PITTSBURGH, PENNSYLVANIA, A CORPORATION OF NEW JERSEY.

APPARATUS FOR FORGING COUPLINGS.

1,157,637.  Specification of Letters Patent.  Patented Oct. 19, 1915.

Application filed March 29, 1915. Serial No. 17,786.

*To all whom it may concern:*

Be it known that I, THOMAS PATTERSON, a citizen of the United States, and resident of Elyria, in the county of Lorain and State of Ohio, have invented certain new and useful Improvements in Apparatus for Forging Couplings, of which the following is a specification.

My invention relates to the manufacture of a pipe coupling from a flat bar of iron or steel which involves bending the bar into a circular shape, lapping and welding the ends, and forming the edges. This is done by several different methods, the most satisfactory and economical of which is commonly called roll-welding. By this method the bar is heated to the proper temperature and is then fed into a machine, the essential features of which are a series of rotating rolls arranged concentrically around a removable mandrel. One end of the heated bar is caught between the mandrel and one of the rolls and the bar is pulled around by friction in such manner that it is bent around the mandrel, the ends are lapped and welded, and the edges shaped in conformity with the contour of the rolls. The practice heretofore followed requires the services of three workmen and inasmuch as the heat is intense and the labor very heavy it is necessary to provide one or more relief men.

An object in the construction of the present device is to provide semi-automatic means for welding couplings to the end that one or more of the operators heretofore required may be dispensed with and the labor of the operators employed be materially reduced. In the present machine an operator is required to feed the heated blanks into the mechanism and another operator is required to actuate the different manually controlled valves and levers.

A further object is to improve the construction of the coupling rolls by providing means for moving the upper instead of the lower rolls, thereby eliminating the excessive wear of the moving parts caused by water and scale.

A still further object is to increase the productive capacity of a single machine by performing simultaneously the operations of welding one coupling and removing the mandrel from a previously formed coupling.

The invention will be more readily understood by reference to the accompanying drawings, wherein—

Figure 1:
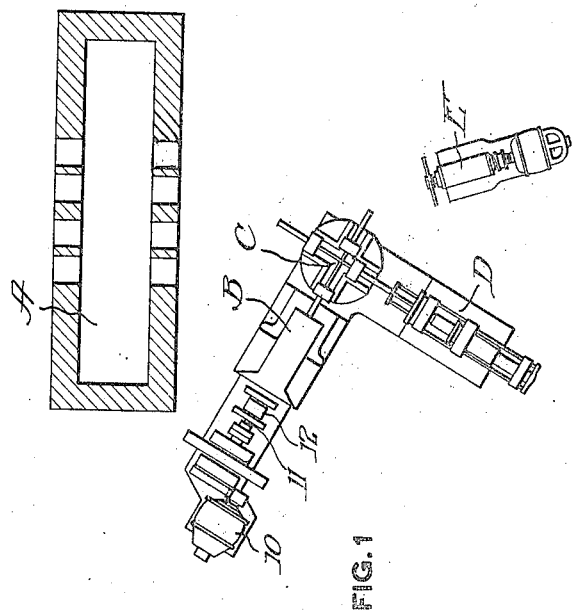
Figure 5:
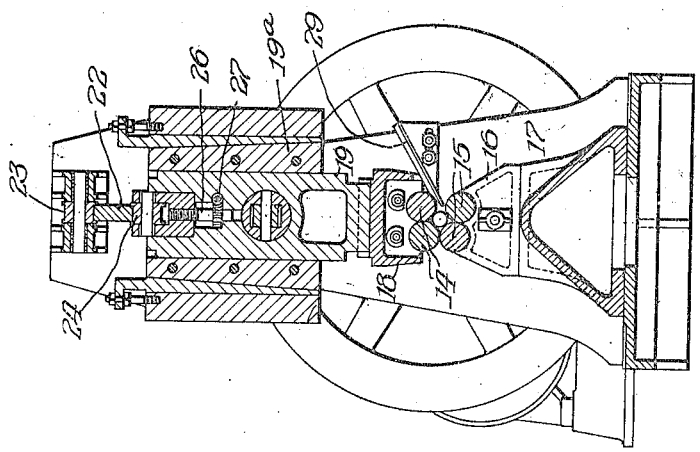

Figure 1 is a diagrammatic illustration of a plant laid out in accordance with my invention, Fig. 2 is a plan view of the contemplated machine, Fig. 3 is a side elevation partly in section on the line III—III of Fig. 2, Fig. 4 is a section on the line IV—IV of Fig. 2, Fig. 5 is a section on the line V—V of Fig. 3, Fig. 6 is a section on the line VI—VI of Fig. 3, and Fig. 7 is a detail sectional elevation on the line VII—VII of Fig. 4.

Referring to the diagrammatic plan view, it will be seen that I provide a heating furnace A in which the bars or plates are heated to a proper temperature. These bars are then removed manually and placed in the roll welding machine B. The mandrels are carried by the rotary turret C and the couplings are removed from the mandrels by the extractor D. A finishing machine E may be associated with the other mechanism, but this forms no part of the present invention.

Referring now to the roll welding machine, best shown in Figs. 2, 3 and 5, it will be seen that a motor 10 serves to cause rotation of a shaft 11 and through gears 12 to operate wabbler shafts 13. These are connected to upper rolls 14 and lower rolls 15. The latter are mounted in suitable housings 16 rigid with the base 17. The upper rolls 14 are mounted in the housing 18, which is suspended from a plunger or ram 19. This member 19 is suitably guided in the main housing 19ª and is normally held in elevated position by means of the pivoted arm 20 having a counterweight 21 on the outer end thereof. As a means for causing vertical reciprocation of the ram and rolls, I provide a horizontally reciprocable cam 22 operating between the upper rigid antifriction roll 23 and the lower antifriction roll 24 mounted on the upper end of the ram. The cam is moved by means of the fluid pressure cylinder 25. As a means for securing a close adjustment of the roll, I provide the threaded shaft 26, best shown in Fig. 5, which serves primarily to adjust the height of the antifriction roll 24. This shaft 26 is actuated by a worm 27 and a hand wheel 28, best shown in Fig. 3. A guide 29 is mounted on the housing (see Fig. 5) and serves to direct the heated bars between the rolls.

By reason of the construction just described, the rolls may be separated to permit the insertion and removal of the mandrel and coupling and the parts adjusted as required, all the moving parts being above the point of actual rolling, with the result that excessive wear, due to water and scale, is eliminated.

The couplings are formed around mandrels and these mandrels, four in number, are carried on the turret, best shown in Figs. 2, 3 and 4. The turret 30, as best shown in Fig. 4, is mounted for rotation on suitable ball bearings 31 supported by a base 32. On the turret and movable between guides 33 are mandrel heads or holders 34. Diametrically opposite heads are connected by means of the rod 35 to the end that opposite heads shall have radial movement in unison. Each of the holders carries a block or bearing member 36 to which the mandrel 37 is rigidly secured. The bearing member has the capacity for vertical movement, being normally held at its upper limit of movement by the coiled spring 38. When the mandrel is in the elevated position it will pass freely between the upper and lower rolls 14, 15, assuming that the upper roll is elevated.

As a means for causing the step by step rotation of the turret 30, I provide the Geneva movement, best shown in Fig. 6, in which the member 39 is rigid with the turret and the star wheel 40 is pivoted to a portion of the frame. The star wheel is provided with rollers 41 adapted to enter the slots of the member 39 and cause rotation thereof, such rollers likewise being contacted by the hook 42, which is movable as required by the extractor later to be described. At each reciprocation of the hook member 42 the star wheel is rotated one step, the hook being allowed to return by being displaced sidewise against the force of the spring 43.

The extractor, best shown in Fig. 4, consists in a fluid pressure piston 44 carrying a plunger 45 at one end which plunger registers with the end of a mandrel in the position it will assume after having been moved 90° from the roll welding position. The view in Fig. 4 illustrates the position of the parts just after a coupling has been ejected from the mandrel 37, the coupling 46 being shown in position on the plunger 45. As the piston 44 is retracted, the coupling 46 will be restrained from a rearward movement with the plunger by the finger 47 and allowed to drop into a suitable receptacle. As a means for stripping the coupling from the mandrel I provide the plate 48, which is held by the bolts 49 and is provided with a lengthwise horizontal notch or open end slots 57 which permits the entrance of the swinging mandrel into the notch or slot through the plate. The means for causing the return of the piston 44 is the small fluid pressure piston 50, which is connected to the large piston 44 by rods 51, best shown in Fig. 2. The hook member 42 is connected to the end of the piston 44 by the bracket 52. It will be seen, therefore, that at each actuation of the ejector plunger the turret is caused to make one quarter revolution.

As heretofore stated, the mandrels and their supporting bearings are normally held in their raised position at which point each mandrel would pass between the rollers 14, 15. It therefore follows that means must be provided for depressing the mandrel together with the upper rolls 14. To accomplish this I provide the bracket 53, which is adapted to contact the upper ends of the plungers which support the springs 38 and are connected to the bearings 36. Thus as the ram 19 descends the mandrel descends in unison therewith. At two of the points in the rotation of the turret I provide spray pipes 54, by means of which water is sprayed onto the mandrels. A valve 55 controls the operation of the fluid pressure cylinder 25, and a valve 56 controls the pistons 44, 50.

Assuming that the rolls 14, 15 are separated and that a mandrel is located therebetween, the operator moves valve 55, which advances cam 22 and causes the upper rolls 14 and the mandrel to descend into the position shown in Fig. 5, whereupon the second operator feeds a heated blank into the machine by means of the guide 29 and a coupling is formed. The operator then releases the pressure in cylinder 25 and counterweight 21 lifts the upper roll and the mandrel which carries the finished coupling thereon. The operator then actuates valve 56, which causes the advance of the piston 44. Assuming that operations have just been started and that no coupling has previously been formed, the piston 44 is retracted after its advancement, this retraction likewise retracting the hooked member 42 and causing a 90° movement of the turret. Thereupon the previously formed coupling is presented to the extractor, the mandrel swinging into the open end of the slot in the plate 48 with the coupling lying to the left of the plate 48 as viewed in Fig. 4. The operator then actuates the ram 45 and ejects the mandrel 37 from the coupling, thus moving both of the diametrically opposite holders 34 to the right as viewed in Fig. 4 and transferring the coupling to the end of the ram 45. This act serves to properly position the right hand mandrel, as viewed in that figure, for reception between the rolls of the welding machine. Upon the retraction of the piston 44 the coupling 46 is caused to drop from the end of the ram 45 when this ram is retracted, and the hook member 42 causes a further quarter revolution of the turret and presents to the ejector the coupling which had just been formed during the stripping operation just described. Thus it will be seen that the operations are continuous; that a coupling is being formed and ejected simultaneously; that the unused mandrels are being cooled during the operation of forming and stripping and that notwithstanding the increased speed of production the number of operators is reduced.

The mechanism shown is only typical of other mechanisms coming within the scope of the appended claims which might be utilized for accomplishing the desired result, and I do not wish to be limited to the exact forms shown and described.

I claim:

1. Roll welding apparatus, including in combination vertically separable rolls, a plurality of mandrels, means for causing a rotary and vertical movement of each mandrel whereby to bring successive mandrels into register with the rolls and to adjust the mandrels in consonance with the vertical movement of the rolls, and means for ejecting the mandrels from a formed coupling, substantially as described.

2. In a mechanism of the class described, the combination of welding rolls, means for causing a vertical movement of one of said rolls, a revoluble turret, a plurality of mandrels mounted on said turret, each of said mandrels being mounted for bodily vertical movement, and means for simultaneously causing vertical movement of said rolls and one of said mandrels, substantially as described.

3. In a device of the class described, the combination of welding rolls, means for causing a vertical reciprocation of one of said rolls, a plurality of mandrels, means for bringing said mandrels successively into register with said rolls, and an ejector, the arrangement being such that a coupling is formed and simultaneously a previously formed coupling is stripped from its mandrel, substantially as described.

4. In a device of the class described, the combination of upper and lower welding rolls, means for causing a separation of one of said rolls relative to the other rolls, a turret, a plurality of mandrels on said turret, a Geneva movement for causing a step by step rotation of said turret, and an ejector for stripping the previously formed couplings from said mandrels, substantially as described.

5. In a device of the class described, the combination of welding rolls, a turret, a plurality of mandrels mounted on said turret, an ejector, and means operable on the successive return movements of said ejector for causing a step by step rotation of said turret, substantially as described.

6. In a device of the class described, the combination of welding rolls, means for causing a vertical movement of one of said rolls, a turret, a plurality of mandrels mounted for vertical movement on said turret, means operable by the roll-reciprocating means for causing a vertical movement of one of said mandrels, an ejector, and means operable by said ejector for causing a step by step rotation of said turret, substantially as described.

7. In a device of the class described, the combination of coupling heating means, welding rolls, mandrel cooling means, a plurality of mandrels, automatic means for successively presenting said mandrels to said welding rolls, and an ejector, the arrangement being such that simultaneously a coupling is formed, another coupling is ejected and the idle mandrels are being cooled, substantially as described.

8. In a device of the class described, the combination of coupling heating means, welding rolls, a plurality of mandrels, automatic means for successively presenting said mandrels to said welding rolls, and an ejector, the arrangement being such that a coupling is formed, while another coupling is being ejected, substantially as described.

Signed at Lorain, Ohio, this 24 day of March, 1915.

THOMAS PATTERSON.

Witnesses:
  CHAS. FELL,
  ARTHUR R. GRABER.